United States Patent [19]

Merz et al.

[11] 3,923,987
[45] Dec. 2, 1975

[54] PHARMACEUTICAL COMPOSITIONS CONTAINING AN N-FURYL-OR THIENYL-METHYL)--OXY-7,8 -DIHYDRO-NORMORPHINONE OR NORCODEINONE AND METHOD OF USE

[75] Inventors: Herbert Merz; Adolf Langbein; Gerhard Walther; Klaus Stockhaus, all of Ingelheim am Rhein, Germany

[73] Assignee: Boehringer Ingelheim GmbH, Ingelheim am Rhein, Germany

[22] Filed: Jan. 16, 1975

[21] Appl. No.: 541,431

Related U.S. Application Data

[62] Division of Ser. No. 386,065, Aug. 6, 1973, Pat. No. 3,872,127.

[30] Foreign Application Priority Data

Aug. 7, 1972 Germany............................ 2238839

[52] U.S. Cl. ............................................... 424/260
[51] Int. Cl.² ...................................... A61K 31/485
[58] Field of Search ..................................... 424/260

[56] References Cited
UNITED STATES PATENTS 3,793,329  2/1974  Merz et al....................... 424/260 X

*Primary Examiner*—Norman A. Drezin
*Attorney, Agent, or Firm*—Hammond & Littell

[57] ABSTRACT

Pharmaceutical compositions containing as an active ingredient a compound of the formula

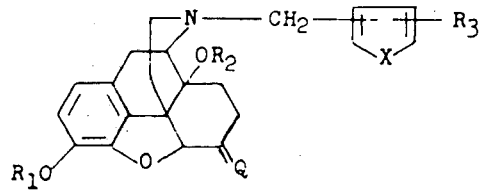

wherein
  $R_1$ is hydrogen, methyl or acetyl,
  $R_2$ is hydrogen or acetyl,
  $R_3$ is hydrogen or methyl,
  Q is oxygen, dimethoxy, diethoxy, ethylene-dioxy or propylene(1,3)dioxy, and
  X is oxygen or sulfur, or a non-toxic, pharmacologically acceptable acid addition salt thereof; and a method of using the same as opiate antagonists.

20 Claims, No Drawings

PHARMACEUTICAL COMPOSITIONS CONTAINING AN N-FURYL-OR THIENYL-METHYL)- -OXY-7,8 -DIHYDRO-NORMORPHINONE OR NORCODEINONE AND METHOD OF USE

This is a division of copending application Ser. No. 386,065, filed Aug. 6, 1973, now U.S. Pat. No. 3,872,127. This invention relates to novel pharmaceutical compositions containing as an active ingredient an N-(furyl- or thienyl-methyl)-14-oxy-7,8-dihydro-normophinone or norcodeinone or a non-toxic pharmacologically acceptable acid addition salt thereof, as well as to a method of using the same as opiate antagonists.

More particularly, the present invention relates to novel pharmaceutical dosage unit compositions containing as an active ingredient a compound of the formula

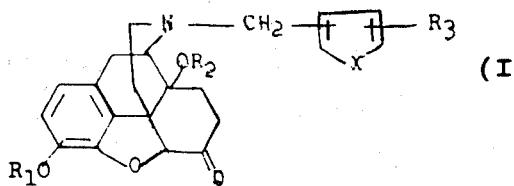

wherein
  $R_1$ is hydrogen, methyl or acetyl,
  $R_2$ is hydrogen or methyl,
  Q is oxygen, dimethoxy, diethoxy, ethylenedioxy or propylene(1,3)dioxy, and
  X is oxygen or sulfur,
or a non-toxic, pharmacologically acceptable acid addition salt thereof.

A subgeneric embodiment thereunder is constituted by compositions containing a compound of the formula

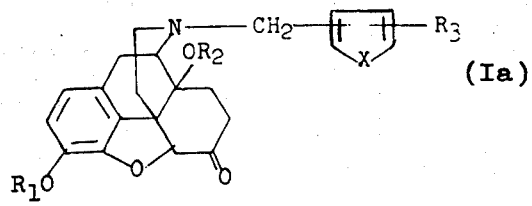

wherein $R_1$, $R_2$, $R_3$ and X have the same meanings as in formula I, or a non-toxic, pharmacologically acceptable acid addition salt thereof, as an active ingredient.

A further subgeneric embodiment thereunder is constituted by compositions containing a compound of the formula

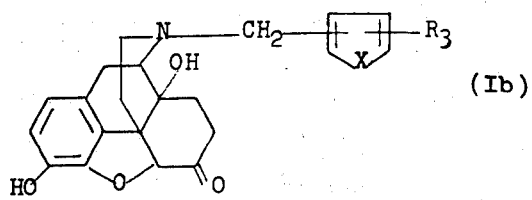

wherein $R_3$ and X have the same meanings as in formula I, or a non-toxic, pharmacologically acceptable acid addition salt thereof, as an active ingredient.

Finally, an especially preferred subgeneric embodiment thereunder is constituted by compositions containing a compound of the formula

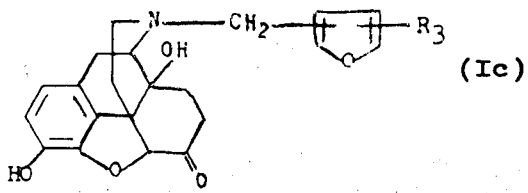

wherein $R_3$ has the same meanings as in formula I, or a nontoxic, pharmacologically acceptable acid addition salt, as an active ingredient.

The compounds embraced by formula I may be prepared by a number of different methods among which the following have proved to be particularly convenient and efficient:

METHOD A

By alkylating a normorphinone or norcodeinone of the formula

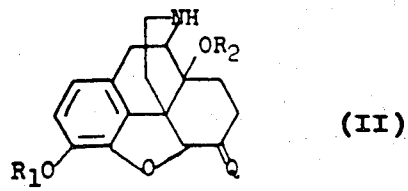

wherein $R_1$, $R_2$ and Q have the same meanings as in formula I, with a furyl- or thienyl-methyl compound of the formula

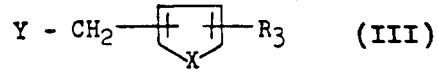

wherein $R_3$ and X have the same meanings as in formula I, and Y is halogen (preferably chlorine, bromine or iodine), arylsulfonyloxy, aralkylsulfonyloxy, alkylsulfonyloxy or any other readily anionically removable substituent.

The reaction is performed with the stoichiometric amount or a slight excess thereover of the alkylating agent of the formula III, and advantageously in the presence of an acid-binding agent, such as triethylamine, N,N-dicyclohexylethylamine, sodium carbonate, potassium carbonate, calcium oxide or preferably sodium bicarbonate. It is advantageous to perform the reaction in an inert organic solvent medium, such as chloroform, methylene chloride, benzene, acetone, dioxane, tetrahydrofuran, dimethylformamide or mixtures of any two or more of these, especially mixtures of dimethylformamide and tetrahydrofuran. The reaction temperature may be varied within wide limits, although temperatures between 0°C and the boiling point of the particular solvent which is used are preferred.

After completion of the reaction, the desired reaction product is isolated, purified and crystallized by conventional procedures.

METHOD B

By subjecting a compound of the formula II or an acid addition salt thereof to a Mannich reaction with a methylfuran of the formula

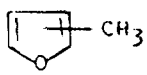  (IV)

in the presence of formaldehyde.

The reaction is carried out in acid solution, especially in weakly acid solution and preferably in acetic acid solution, the solvent medium being water, a lower alkanol, tetrahydrofuran, dioxane or mixtures of any two or more of these. The formaldehyde may be provided in stoichiometric amount or in slight excess thereof, either as such or in the form of paraformaldehyde, or most preferably in aqueous solution (formalin). The furan reactant of the formula IV is provided in the stoichiometric amount or in slight excess thereover. The reaction temperature may be varied with the range of 0°C and the boiling point of the particular solvent medium which is used, but a temperature between 20° and 40°C is preferred.

After completion of the reaction, the desired reaction product is isolated, purified and crystallized by conventional procedures.

METHOD C

By reducing a carboxylic acid amide or thioamide of the formula

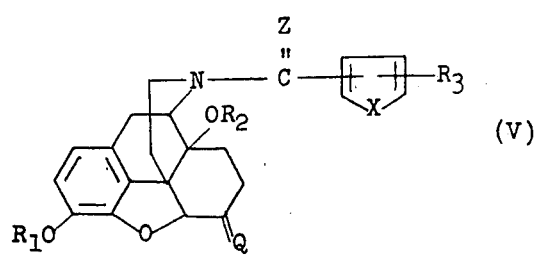  (V)

wherein $R_1$, $R_2$, $R_3$, Q and X have the same meanings as in formula I, and Z is oxygen or sulfur.

The reduction of a carboxylic acid amide of the formula V (Z = oxygen) may be effected by various known methods, among which the reduction with a complex hydride, especially with lithium aluminum hydride, is particularly preferred. However, this reduction can be applied only to those carboxylic acid amides of the formula V wherein Q is other than oxygen. The complex hydride is provided in the stoichiometric amount or in excess thereover, preferably up to twice the calculated amount. The reduction is advantageously performed in an inert organic solvent medium, such as diethyl ether, diisopropyl ether or especially tetrahydrofuran. The reaction temperature may be varied within wide limits, but the preferred range is between 0°C and the boiling point of the particular solvent which is used.

The reduction of a thioamide of the formula V (Z = sulfur) may be effected with a complex hydride; with nascent hydrogen generated in situ by zinc/acetic acid or aluminum amalgam/water, for example; by catalytic hydrogenation in the presence of Raney nickel; or by electro-chemical reduction. The limitation regarding the meaning of Q set forth above in connection with the carboxylic acid amides of the formula V does not apply to the thiomides.

After completion of the reduction, the desired end product is isolated, purified and crystallized by conventional procedures.

METHOD D

By cleavage of a functional oxo-group derivative of the formula

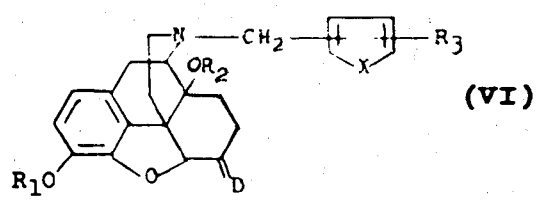  (VI)

wherein $R_1$, $R_2$, $R_3$ and X have the same meanings as in formula I, and D is = NOH, = N-$NH_2$, = N-NH-CO-$NH_2$, = N-NH-(C=NH)-$NH_2$, two monovalent oxyalkyl groups (ketal grouping) or a dioxyalkylene group (cycloketal grouping).

The cleavage is effected by hydrolysis in an acid medium pursuant to known methods, and the reaction product is isolated, purified and crystallized by conventional procedures.

METHOD E

For the preparation of a compound of the formula I wherein Q is other than oxygen, by ketalization of a compound of the formula Ia.

The reaction is carried out pursuant to known methods. For instance, the ketone of the formula Ia is reacted with the desired hydroxy compound in the presence of an acid catalyst, such a p-toluenesulfonic acid, concentrated sulfuric acid, perchloric acid, aluminum chloride or borontrifluoride, in a suitable solvent medium. The hydroxy compound is advantageously provided in excess over the calculated amount, and a sufficiently large excess may serve as the solvent medium for the ketalization reaction. The water released by the reaction may be continuously removed during the reaction in vacuo or by azeotropic distillation. It is of advantage to employ a ketalization agent, such as an orthoformate, a sulfurous acid ester, a silicate or the like.

After completion of the reaction, the desired end product is isolated, purified and crystallized by conventional procedures.

METHOD F

For the preparation of a compound of the formula I wherein $R_1$ and $R_2$ are acetyl, by acetylating a compound of the formula I wherein $R_1$ and/or $R_2$ are hydrogen.

The acetylation is effected by known methods with conventional acetylating agents, such as acetic acid anhydride, acetyl chloride or ketene. It may be carried out in a suitable inert solvent medium, such as pyridine, or also without a separate solvent, especially when acetic acid anhydride is used, provided a sufficient excess of the acetylating agent is supplied.

After completion of the reaction, the desired end product is isolated, purified and crystallized by conventional procedures.

The starting compounds required for methods A to E are either known compounds or may be prepared by known methods.

For instance, the compounds of the formula II, wherein $R_1$ is hydrogen or methyl, $R_2$ is hydrogen and Q is oxygen, are described in the literature [see Takamine Kenkyusko Nempo 12, 56–62 (1960); and C.A. 55, 8449 d, e and f].

A compound of the formula II wherein $R_1$ and/or $R_2$ are acetyl may be obtained, for example, by N-benzylation, followed by acetylation, and subsequent removal of the N-benzyl protective group by catalytic hydrogenation.

A compound of the formula II or VI wherein Q and D, respectively, are ketal groupings may be obtained by ketalization of a corresponding oxo-compound (Q or D = oxygen) in analogy to method E.

An amide or thioamide of the formula V may be obtained in conventional fashion by N-acylation of the corresponding nor-compound, as illustrated in Examples 12–20 below.

A compound of the formula VI, wherein D is other than a ketal or cycloketal grouping, may be obtained by conventional methods, such as by oximation or the like, from the corresponding ketone (D = oxygen).

The compounds embraced by formula I are organic bases and therefore form acid addition salts with inorganic or organic acids. Examples of non-toxic, pharmacologically acceptable acid addition salts are those formed with hydrochloric acid, hydrobromic acid, hydroiodic acid, hydrofluoric acid, sulfuric acid, phosphoric acid, nitric acid, acetic acid, propionic acid, butyric acid, valeric acid, pivalic acid, caproic acid, oxalic acid, malonic acid, succinic acid, maleic acid, fumaric acid, lactic acid, tartaric acid, citric acid, malic acid, benzoic acid, phthalic acid, cinnamic acid, salicylic acid, ascorbic acid, 8-chlorotheophylline, methanesulfonic acid or the like.

The following examples illustrate the preparation of compounds of the formula I.

EXAMPLE 1

N-Furfuryl-14-hydroxy-7,8-dihydro-normorphinone and its hydrochloride by method A A mixture consisting of 6.26 gm (0.02 mol) of 14-hydroxy-7,8-dihydro-normorplinone hydrochloride, 60 ml of dimethylformamide, 10 ml of tetrahydrofuran, 4.2 gm of sodium bicarbonate and 2.6 gm (0.022 mol) of furfuryl chloride was refluxed for four hours. Thereafter, the reaction solution was evaporated in vacuo, and the residue was shaken with a mixture consisting of 50 ml of chloroform and 50 ml of water. The aqueous phase was separated and extracted twice with 25 ml of chloroform, the extracts were combined with the organic phase, and the combined chloroform solutions were washed with water, dried with sodium sulfate and evaporated in vacuo.

The residue consisted of raw N-furfuryl-14-hydroxy-7,8-dihydro-normorphinone, which was dissolved in 50 ml of chloroform.

a. 25 ml of the chloroform solution of the raw base were poured into a column of 40 gm of aluminum oxide (activity III, neutral), and the column was eluted with chloroform. The eluate was collected in fractions of 20 ml each, and each fraction was thin-layer-chromatographically tested for content of pure base. Those fractions containing the pure base were combined and evaporated in vacuo, and the residue was crystallized from ethyl acetate, yielding 2.1 gm (57 percent of theory) of the free base of the formula

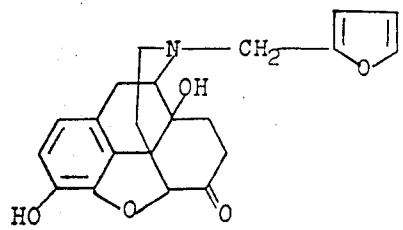

which had a melting point of 240°C. A sample recrystallized from ethyl acetate had a metling point of 241°C.

b. The other 25 ml of the chloroform solution of the raw base were introduced into a silicagel column prepared with 250 gm of silicagel and a flow agent consisting of chloroform/methanol/concentrated ammonia in the ratio 90:10:0.5. The column was eluted with the indicated flow agent, and the eluate was collected in fractions of 25 ml each. The fractions were thin-layer-chromatographically tested for content of pure base, those fractions containing the pure base were combined, and the combined fractions were evaporated in vacuo. The residue was dissolved in a little ethanol in the presence of 4.0 ml of 2.5 N ethanolic hydrochloric acid, and the resulting solution was admixed with absolute ether until it just began to turn cloudy. The mixture was allowed to stand overnight in a refrigerator, and the precipitate formed thereby was collected by vacuum filtration, washed first with ethanol/ether (1:1) and then only with ether, and dried at 80°C, yielding 2.5 gm (61.5 percent of theory) of crystalline N-furfuryl-14-hydroxy-7,8-dihydronormorphinone hydrochloride having a melting point of 230°C which did not change after recrystallization from ethanol/ether.

EXAMPLE 2

N-Thenyl-14-hydroxy-7,8-dihydro-normorphinone and its hydrochloride by method A

A mixture consisting of 3.24 gm (0.01 mol) of 14-hydroxy-7,8-dihydro-normorphinone hydrochloride, 1.45 gm (0.011 mol) of thenyl chloride, 2.1 gm of sodium bicarbonate and 50 ml of dimethylformamide was stirred at 60°C for five hours. Thereafter, the reaction solution was evaporated in vacuo, and the residue was shaken with a mixture consisting of 50 ml of chloroform and 50 ml of water. The aqueous phase was separated and extracted twice with 25 ml of chloroform each, the extracts were combined with the chloroform phase, and the combined chloroformic solutions were washed with water, dried with sodium sulfate and evaporated in vacuo. The residue, the free base N-thenyl-14-hydroxy-7,8-dihydronormorphinone, was dissolved in a little ethanol by adding 4.0 ml of 2.5 N ethanolic hydrochloric acid, and the resulting solution was admixed with absolute ether until it just began to turn cloudy. The mixture was allowed to stand overnight in a refrigerator, and the precipitate formed thereby was collected by vacuum filtration, washed first with ethanol/ether (1:1) and then with only ether, and dried at 80°C, yielding 2.7 gm (64 percent of theory) of the hydrochloride of the formula

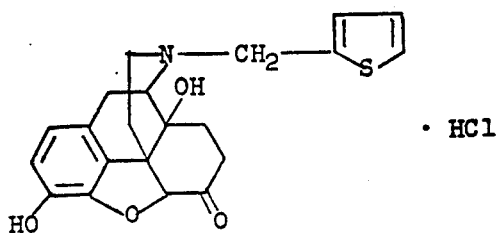

which had a melting point of 290°–291°C. Recrystallization from ethanol/ether did not change the melting point.

EXAMPLE 3

Using a procedure analogous to that described in Example 2, 2.9 gm (69 percent of theory) of N-3′-thienyl-methyl)-14-hydroxy-7,8-dihydro-normorphinone hydrochloride, m.p. 319°C, were obtained from 3.24 gm (0.01 mol) of 14-hydroxy-7,8-dihydro-normorphinone hydrochloride and 1.95 gm (0.011 mol) of 3-bromomethyl-thiophene.

EXAMPLE 4

Using a procedure analogous to that described in Example 2, 3.7 gm (88.5 percent of theory) of N-furfuryl-14-hydroxy-7,8-dihydro-norcodeinone hydrochloride, m.p. 241°C, of the formula

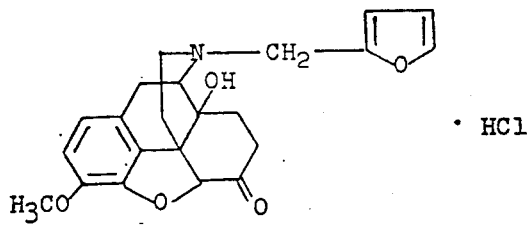

were obtained from 3.37 gm (0.01 mol) of 14-hydroxy-7,8-dihydro-norcodeinone hydrochloride and 1.26 gm (0.011 mol) of fufuryl chloride.

After recrystallization from ethanol/ether the product had a melting point of 243°C.

EXAMPLE 5

Using a procedure analogous to that described in Example 2, 3.1 gm (74 percent of theory) of n-(3′-furyl-methyl)-14-hydroxy-7,8-dihydro-norcodeinone hydrochloride, m.p. 265°C, were obtained from 3.37 gm (0.01 mol) of 14-hydroxy-7,8-dihydro-norcodeinone hydrochloride and 1.26 gm (0.011 mol) of 3-chloromethyl-furan with a mixture of 20 ml of dimethylformamide and 15 ml of tetrahydrofuran as the solvent medium.

EXAMPLE 6

Using a procedure analogous to that described in Example 2, 3.5 gm (81 percent of theory) of N-(2′-methyl-3′-furyl-methyl)-14-hydroxy-7,8-dihydro-norcodeinone hydrochloride, m.p. 272°C, were obtained from 3.37 gm (0.01 mol) of 14-hydroxy-7,8-dihydro-norcodeinone hydrochloride and 1.43 gm (0.011 mol) of 2-methyl-3-chloromethyl-furan with a mixture of 20 ml of tetrahydrofuran and 15 ml of dimethylformamide as the solvent medium.

EXAMPLE 7

Using a procedure analogous to that described in Example 2, 73 percent of theory of N-thenyl-14-hydroxy-7,8-dihydronorcodeinone hydrochloride, m.p. 259°–260°C, was obtained from 3.38 gm (0.01 mol) of 14-hydroxy-7,8-dihydro-norcodeinone hydrochloride and 1.45 gm (0.011 mol) of thenyl chloride.

EXAMPLE 8

Using a procedure analogous to that described in Example 2, 3.7 gm (85 percent of theory) of N-(3′-thienyl-methyl)-14-hydroxy-7,8-dihydro-norcodeinone hydrochloride, m.p. 280°–281°C, were obtained from 3.38 gm (0.01 mol) of 14-hydroxy-7,8-dihydro-norcodeinone hydrochloride and 1.95 gm (0.011 mol) of 3-bromomethyl-thiophene.

EXAMPLE 9

N-(2′-Methyl-3′-furylmethyl)-14-hydroxy-7,8-dihydro-6,6-ethylenedioxy-desoxynorcodeine by method A A mixture consisting of 6.58 gm (0.01 mol) of 14-hydroxy-7,8-dihydro-6,6-ethylenedioxy-desoxynorcodeine, 30 ml of dimethylformamide, 40 ml of tetrahydrofuran, 2.5 gm of sodium bicarbonate and 2.9 gm (0.011 mol) of 2-methyl-3-chloromethylfuran was refluxed for four hours, accompanied by stirring. Thereafter, the reaction solution was evaporated in vacuo, the residue was shaken with a mixture of 50 ml of chloroform and 50 ml of water and the aqueous phase was separated and extracted twice with 25 ml of chloroform each. The chloroform extracts were combined with the chloroform phase and the combined solution was dried with sodium sulfate and evaporated in vacuo. The residue was crystallized from a mixture consisting of 100 ml of methanol and 50 ml of water, and the mixture was allowed to stand overnight. Thereafter, the crystalline substance was collected by vacuum filtration, washed with aqueous methanol and dried, first in the air and finally at 80°C, yielding 4.2 gm (65 percent of theory) of the compound of the formula

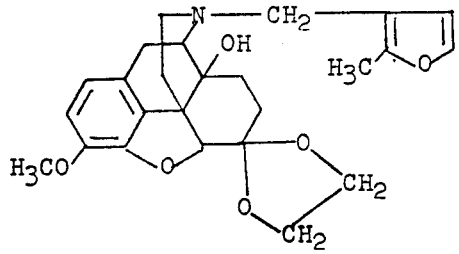

having a melting point of 155°C which did not change after recrystallization from methanol/water.

EXAMPLE 10

N-(5′-Methyl-furfuryl)-14-hydroxy-7,8-dihydro-normorphinone by method B 3.24 gm (0.01 mol) of 14-hydroxy-7,8-dihydro-normorphinone hydrochloride were dissolved in 10 ml of aqueous 50 percent acetic acid, the solution was admixed 1.1 ml of aqueous 30 percent formaldehyde (0.011 mol CH₂O) and 0.9 gm (0.011 mol) of 5-methyl-furan, and the resulting mixture was stirred for 8 hous at room temperature. Thereafter, the reaction solution was evaporated in vacuo, the residue was shaken with a mixture consisting of 50 ml of chloroform, 50 ml of water and an excess of ammonia, and the aqueous phase was separated and extracted twice with 25 ml of chloroform each. The chloroform extracts were combined with the chloroform phase, and the combined solution was washed with water, dried with sodium sulfate and evaporated in vacuo. The residue, consisting of the raw reaction product, was chromatographically purified in an aluminum oxide column, as described in Example 1(a), and the purified base was crystallized from toluene and dried at 105°C, yielding 1.5 gm of N-(5'-methylfurfuryl)-14-hydroxy-7,8-dihydro-normorphinone with a melting point of 180°–181°C which remained unchanged after recrystallization from toluene.

EXAMPLE 11

N-(5'-Methyl-furfuryl)-14-hydroxy-7,8-dihydro-norcodeinone and its hydrochloride by method B Using a procedure analogous to that described in Example 10, 3.37 gm (0.01 mol) of 14-hydroxy-7,8-dihydro-norcodeinone hydrochloride was reacted in 10 ml of aqueous 50 percent acetic acid with 1.1 gm of aqueous 30 percent formaldehyde (0.011 mol CH₂O) and 0.9 gm (0.011 mol) of 5-methyl-furan, the reaction mixture was worked up, and the raw reaction product was purified by column chromatography on aluminum oxide. The purified free base (2 gm) was dissolved in 5 ml of ethanol by adding 2.5 N ethanolic hydrochloric acid thereto until just acid reaction, the acidic solution was admixed with absolute ether until it began to turn cloudy, and the mixture was allowed to stand overnight in a refrigerator. Thereafter, the crystalline precipitate was collected by vacuum filtration, washed first with ethanol/ether and then with only ether, and dried at 80°C, yielding 1.2 gm of crystalline N-(5'-methyl-furfuryl)-14-hydroxy-7,8-dihydro-norcodeine hydrochloride with a melting point of 204°–205°C which did not change after recrystallization from ethanol/ether.

EXAMPLE 12

N-Furfuryl-14-hydroxy-7,8-dihydro-6,6-ethylenedioxydesoxynorcodeine by method C a. 14-Hydroxy-7,8-dihydro-6,6-ethylenedioxydesoxynorcodeine and its hydrochloride A mixture consisting of 20.3 gm (0.06 mol) of 14-hydroxy-7,8-dihydro-norcodeinone hydrochloride, 80 ml of ethyleneglycol and 2.3 gm of p-toluenesulfonic acid was heated for 2 hours at 80°C in a vacuum of 0.01 mm Hg. Thereafter, the reaction mixture was cooled and then stirred into 50 ml of 2 N sodium hydroxide, and the crystalline precipitate formed thereby was collected by vacuum filtration, washed several times with water and dried, first in the air and finally at 80°C, yielding 17.5 gm (84.5 percent of theory) of 14-hydroxy-7,8-dihydro-6,6-ethylenedioxy-desoxynorcodeine, m.p. 201°C.

2.0 gm of the free base thus obtained were dissolved in ethanol by adding the calculated amount of 2.5 N ethanolic hydrochloric acid thereto, and the resulting acidic solution was admixed with absolute ether until it just began to turn cloudy. Upon standing, a crystalline substance separated out which was collected by vacuum filtration, washed several times with water and dried, first in the air and finally at 80°C, yielding 2.0 gm of the hydrochloride of 14-hydroxy-7,8-dihydro-6,6-ethylenedioxy-desoxynorcodeine with a melting point of 307°C which remained unchanged after recrystallization from ethanol/ether.

b. N-(2'-Furoyl)-14-hydroxy-7,8-dihydro-6,6-ethylenedioxy-desoxynorcodeine 6.9 gm (0.02 mol) of 14-hydroxy-7,8-dihydro-6,6-ethylenedioxy-desoxynorcodeine were dissolved in 140 ml of methanol, and, while vigorously stirring the solution, it was admixed with a solution of 5 gm of potassium carbonate in 8 ml of water. While stirring the resulting suspension, a total of 2.88 gm (0.022 mol) of furan-2-carboxylic acid chloride were added thereto over a period of about 15 minutes in five portions, and the resulting mixture was stirred for one hour more. Thereafter, the reaction mixture was evaporated, the residue was shaken with a mixture consisting of 50 ml of chloroform and 25 ml of water, the aqueous phase was separated and again extracted with 25 ml of chloroform, the chloroform extract was combined with the chloroform phase, and the combined solution was washed in rapid succession with 25 ml of 2 N hydrochloric acid, 25 ml of water and 25 ml of 1 N sodium bicarbonate, all in the presence of ice. The washed solution was now dried with sodium sulfate and evaporated in vacuo, leaving as a residue raw N-(2'-furoyl)-14-hydroxy-7,8-dihydro-6,6-ethylenedioxy-desoxynorcodeine. A small sample, recrystallized from aqueous methanol, had a melting point of 196°C.

c. The raw reaction product obtained under (b) was dissolved in 50 ml of absolute tetrahydrofuran, and the solution was added dropwise over a period of about 30 minutes to an ice-cooled suspension of 2.4 gm of lithium aluminum hydride in 30 ml of tetrahydrofuran, accompanied by stirring. Thereafter, the ice bath was removed, and the reaction mixture was stirred for 30 minutes more at room temperture and then refluxed for 2 hours. Subsequently, the reaction mixture was again placed on an ice bath and, while stirring, 6 ml of water were added dropwise and then it was admixed with 150 ml of an aqueous saturated diammonium tartrate solution. The resulting mixture was now thoroughly shaken in a separating funnel, and then the tetrahydrofuran (upper) phase was separated and evaporated in vacuo. The aqueous phase was extracted once with 50 ml of chloroform and twice with 25 ml of chloroform each, the chloroform extracts were combined, the evaporation residue of the tetrahydrofuran phase was dissolved in the combined chloroform extracts, and the resulting solution was washeed with water, dried over sodium sulfate and evaporated in vacuo. The residue was crystallized from a mixture consisting of 45 ml of methanol and 15 ml of water, and the crystallizate was collected by vacuum filtration, washed with a little aqueous methanol and dried, first in the air and finally at 80°C, yielding 7.5 gm (95 percent of theory, based on steps b and c) of N-furfuryl-14-hydroxy-7,8-dihydro-6,6-ethylenedioxy-desoxynorcodeine, m.p. 92°–94°C. After recrystallization from aqueous methanol the product had a melting point of 99°C.

EXAMPLE 13

N-(3'-Furyl-methyl)-14-hydroxy-7,8-dihydro-6,6-ethylenedioxy-desoxynorcodeine by method C a. N-(3'Furoyl)-14-hydroxy-7,8-dihydro-norcodeinone 20.3 gm (0.06 mol) of 14-hydroxy-7,8-dihydro-norcodeinone hydrochloride were dissolved in 350 ml of methanol, and, while vigorously stirring the solution, it was admixed with a solution of 15 gm of potassium carbonate in 24 ml of water. While stirring the resulting suspension, a total of 8.7 gm (0.066 mol) of furan-3carboxylic acid chloride were added in five portions thereto over a period of about 15 minutes, and the resulting mixture was stirred for one hour more. Thereafter, it was evaporated, the residue was shaken with a mixture consisting of 100 ml of chloroform and 50 ml of water, and the aqueous phase was separated and again extracted once with 50 ml of chloroform. The chloroform extract was combined with the chloroform phase, and the combined solution was washed in rapid succession with 50 ml of 2 N hydrochloric acid, 50 ml of water and 50 ml of 1 N sodium bicarbonate, all in the presence of ice. The washed solution was then dried with sodium sulfate and evaporated in vacuo, leaving 26.4 gm of raw, syrupy N-(3'-furoyl)-14-hydroxy-7,8-dihydro-norcodeinone.

b. N-(3'-Furoyl)-14-hydroxy-7,8-dihydro-6,6-ethylenedioxy-desoxynorcodeine

The raw reaction product obtained in step (a) was admixed with 100 ml of ethyleneglycol and 2.0 gm of p-toluenesulfonic acid, and the mixture was heated for two hours at 80°C in a vacuum of 0.01 mm Hg. Thereafter, the reaction mixture was cooled and then stirred into a solution of 30 gm of sodium carbonate in 90 ml of water. The resulting mixture was extracted once with 100 ml of chloroform and twice with 50 ml of chloroform each, and the chloroform extracts were combined, washed with aqueous sodium carbonate, dried with sodium sulfate and evaporated in vacuo. The residue was crystallized from 80 ml of methanol, the mixture was allowed to stand overnight in refrigerator, and the crystallizate was collected by vacuum filtration, washed with a little methanol, and dried first in the air and finally at 80°C, yielding 18.6 gm (73.5 percent of theory, based on steps a and b) of N-(3'-furoyl-14-hydroxy-7,8-dihydro-6,6-ethylenedioxy-desoxynorcodeine, m.p. 162°C.

c. 9.3 gm (0.0212 mol) of the end product of step (b) were dissolved in 150 ml of absolute tetrahydrofuran, and the solution was added dropwise over a period of about 1 hour to an ice-cooled suspension of 2.6 gm of lithium aluminum hydride in 50 ml of tetrahydrofuran, accompanied by stirring. Thereafter, the ice bath was removed, and the reaction mixture was stirred for 1 hour at room temperature and then refluxed for 2 hours. The reaction mixture was worked up as described in Example 12(c), and the product was crystallized from 100 ml of methanol and 15 ml of water, yielding 7.2 gm (80 percent of theory) of N-(3'-furylmethyl)-14-hydroxy-7,8-dihydro-6,6-ethylenedioxy-desoxynorcodeine, m.p. 127°C. After recrystallization from aqueous methanol the compound had a melting point of 130°C.

EXAMPLE 14

Using a procedure analogous to that described in Example 12, 6.7 gm (79 percent of theory) of N-(3'-methyl-furfuryl)-14-hydroxy-7,8-dihydro-6,6-ethylenedioxy-desoxynorcodeine, m.p. 144°C, were obtained starting from 6.9 gm (0.02 mol) of 14-hydroxy-7,8-dihydro-6,6-ethylenedioxy-desoxynorcodeine and 3.2 gm (0.022 mol) of 3-methyl-furan-2-carboxylic acid chloride, followed by reduction of the intermediate N-(3'-methyl-2'-furoyl)-14-hydroxy-7,8-dihydro-6,6-ethylenedioxy-desoxynorcodeine (m.p. 223°C, from aqueous methanol) with lithium aluminum hydride.

EXAMPLE 15

Using a procedure analogous to that described in Example 12, 6.05 gm (71.5 percent of theory) of N-(2'-methyl-3'-furylmethyl)-14-hydroxy-7,8-dihydro-6,6-ethylenedioxy-desoxynorcodeine, m.p. 155°C, were obtained starting from 6.9 gm (0.02 mol) of 14-hydroxy-7,8-dihydro-6,6-ethylenedioxy-desoxynorcodeine and 3.2 gm (0.022 mol) of 2-methyl-3-furoylchloride, followed by reduction of the intermediate N-(2'-methyl-3'-furoyl)-14-hydroxy-7,8-dihydro-6,6-ethylenedioxy-desoxynorcodeine (m.p. 226°C, from aqueous methanol) with lithium aluminum hydride.

EXAMPLE 16

Using a procedure analogous to that described in Example 12, 6.4 gm (75 percent of theory) of N-thenyl-14-hydroxy-7,8-dihydro-6,6-ethylenedioxy-desoxynorcodeine, m.p. 125°C, were obtained starting from 6.9 gm (0.02 mol) of 14-hydroxy-7,8-dihydro-6,6-ethylenedioxy-desoxynorcodeine and 3.2 gm (0.022 mol) of thiophene-2-carboxylic acid chloride, followed by reduction of the intermediate N-(2'-thenoyl)-14-hydroxy-7,8-dihydro-6,6-ethylenedioxy-desoxynorcodeine with 2.4 gm of lithium aluminum hydride.

EXAMPLE 17

Using a procedure analogous to that described in Example 13, N-(3'-furylmethyl)-14-hydroxy-7,8-dihydro-6,6-propylenedioxy-desoxynorcodeine was obtained by starting from 10.15 gm (0.03 mol) of 14-hydroxy-7,8-dihydro-norcodeinone hydrochloride and 4.35 gm of furan-3-carboxylic acid chloride, ketalizing the intermediate N-(3'-duroyl)-14-hydroxy-7,8-dihydro-norcodeinone with 50 ml of propyleneglycol and 1 gm of p-toluenesulfonic acid, and reducing the resulting N-(3'-furoyl)-14-hydroxy-7,8-dihydro-6,6-propylenedioxy-desoxynorcodeine with lithium aluminum hydride.

EXAMPLE 18

N-(3'-Furylmethyl)-14-hydroxy-7,8-dihydro-6,6-dimethoxy-desoxynorcodeine by method C a. N-(3'-Furoyl)-14-hydroxy-7,8-dihydro-norcodeinone In a manner analogous to that described in Example 13(a), 3.45 gm (0.01 mol) of 14 hydroxy-7,8-dihydro-norcodeinone hydrochloride were reacted with 1.44 gm of furan-3-carboxylic acid chloride, and the reaction mixture was worked up, yielding raw, syrupy N-(3'-furoyl)-14-hydroxy-7,8-dihydro-norcodeinone.

b. N-(3'-Furoyl)-14-hydroxy-7,8-dihydro-6,6-dimethoxy-desoxynorcodeine

The raw reaction product obtained in step (a) was dissolved in 40 ml of absolute methanol, and the solution was admixed with 2 ml of 75 percent perchloric acid and 20 ml of trimethylorthoformate. The resulting mixture was allowed to stand at room temperature for two hours and was then introduced into 150 ml of a saturated aqueous sodium carbonate solution. The mixture was extracted three times with 50 ml of chloroform each, and the combined extracts were washed with water, dried with sodium sulfate and evaporated in vacuo, leaving as a residue raw N-(3'-furoyl)-14- hydroxy-7,8-dihydro-6,6-dimethoxy-desoxynor-codeine.

(c) The end product of step (b) was reduced with 1.2 gm of lithium aluminumhydride and the reaction mixture worked up as described in Example 12(c), yielding the compound of the formula

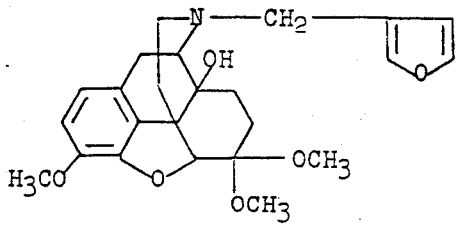

EXAMPLE 19

N-(3'-Furylmethyl)-14-hydroxy-7,8-dihydro-6,6-diethoxy-desoxynorcodeine by method C Using a procedure analogous to that described in Example 18(a), 3.45 gm (0.01 mol) of 14-hydroxy-7,8-dihydronorcodeinone hydrochloride were reacted with 1.44 gm of furan-3-carboxylic acid chloride, yielding the intermediate N-(3'-furoyl)-14-hydroxy-7,8-dihydro-norcodeinone.

The intermediate was ketalized in analogy to Example 18(b) with 40 ml of absolute ethanol, 2 ml of 72 percent perchloric acid and 20 ml of triethyl orthoformate, the reaction time being increased to 24 hours, to form N-(3'-furoyl)-14-hydroxy-7,8-dihydro-6,6-diethoxy-desoxynorcodeine.

The ketalization product was then reduced with lithium aluminum hydride in analogy to Example 18(c), yielding 1.1 gm (24 percent of theory) of N-3'-furylmethyl)-14-hydroxy-7,8-dihydro-6,6-diethoxy-desoxynorcodeine having a melting point of 118°C which did not change after recrystallization of the product from aqueous methanol.

EXAMPLE 20

N-Fufuryl-14-hydroxy-7,8-dihydro-6,6-ethylenedioxy-desoxynormorphine by method C a. N-(2'-Furoyl)-14-hydroxy-7,8-dihydro-normorphinone Using a procedure analogous to that described in Example 13(a), 9.75 gm (0.03 mol) of 14-hydroxy-7,8-dihydronormorphine hydrochloride were reacted in 200 ml of methanol in the presence of 7.5 gm of potassium carbonate and 12 ml of water with 4.3 gm of furan-2-carboxylic acid chloride, and the reaction mixture was worked up, yielding 9 gm of syrupy N-(2'-furoyl)-14-hydroxy-7,8-dihydro-normorphinone. A sample thereof, recrystallized from ethyl acetate, had a melting point of 253°C.

b. N-(2'-Furoyl)-14-hydroxy-7,8-dihydro-6,6-ethylenedioxy-desoxynormorphine

A mixture consisting of 3.0 gm of the syrupy reaction product obtained in step (a), 15 ml of ethyleneglycol and 0.5 gm of p-toluenesulfonic acid was heated for 2 hours at 80°C in a vacuum of 0.01 ml Hg. Thereafter, the reaction mixture was cooled and then introduced into a solution of 5 gm of sodium carbonate in 50 ml of water. The resulting mixture was extracted once with 50 ml of chloroform and twice with 25 ml of chloroform each, and the organic extracts were combined, washed with 25 ml of water, dried with sodium sulfate, and evaporated in vacuo, leaving as the residue raw N-(2'-furoyl)-14-hydroxy-7,8-dihydro-6,6-ethylenedioxy-desoxynormorphine.

(c) In analogy to Example 12(c), the raw reaction product obtained in step (b) above was reduced with 1.2 gm of lithium aluminum hydride, and the reduction product was isolated and crystallized from aqueous methanol, yielding 1.8 gm (43 percent of theory) of N-furfuryl-14-hydroxy-7,8-dihydro-6,6-ethylenedioxy-desoxynormorphine having a melting point of 221°C which did not change after recrystallization from aqueous methanol.

EXAMPLE 21

Using procedures analogous to those described in Example 20(a), (b) and (c), 9.0 gm (55 percent of theory) of N-(3'-furylmethyl)-14-hydroxy-7,8-dihydro-6,6-ethylenedioxy-desoxynormorphine, m.p. 235°C (238°C after recrystallization from aqueous methanol), were obtained from 13.0 gm (0.04 mol) of 14-hydroxy-7,8-dihydro-normorphinone hydrochloride.

EXAMPLE 22

N-(3'-Methyl-furfuryl)-14 hydroxy-7,8-dihydro-norcodeinone and its hydrochloride by method D 3.7 gm (0.0087 mol) of N-(3'-methyl-furfuryl)-14-hydroxy-7,8-dihydro-6,6-ethylenedioxy-desoxynorcodeine (see Example 14) were refluxed in 50 ml of 2N hydrochloric acid for 30 minutes. Thereafter, the solution was allowed to cool and was then admixed with 15 ml of concentrated ammonia, and the resulting mixture was extracted three times with 25 ml of chloroform each. The combined organic extracts were washed with water, dried with sodium sulfate and evaporated in vacuo, and the residue, the free base N-(3'-methyl-furfuryl-14-hydroxy-7,8-dihydro-norcodeinone, was dissolved in 40 ml of ethanol by addition of 4 ml of 2.5 N ethanolic hydrochloric acid. The resulting solution was admixed with absolute ether until it just began to turn cloudy, the mixture was allowed to stand in a refrigerator overnight, and the crystallizate formed thereby was collected by vacuum filtration, washed first with ethanol/ether and then with only ether, and then dried first in the air and finally at 80°C, yielding 3.4 gm (90 percent of theory) of the hydrochloride of the formula

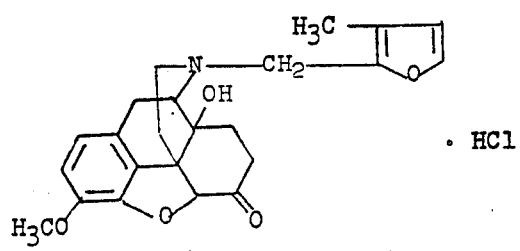

having a melting point of 239°C, which remained unchanged after recrystallization from 50 ml of methanol, 5 ml of water and 100 ml of ether.

EXAMPLE 23

N-(3'-Furylmethyl)-14-hydroxy-7,8-dihydro-normorphinone and its hydrochloride by method D Using a three-step procedure analogous to that described in Example 20, 3.24 gm (0.01 mol) of 14-hydroxy-7,8-dihydro-normorphine hydrochloride were reacted with 1.44 gm of furan-3-carboxylic acid chloride, the reaction product was ketalized withe ethylene glycol, and the ketalization product was reduced with 1.2 gm of lithium aluminum hydride to form N-(3'-furylmethyl)-14-hydroxy-7,8-dihydro-6,6-ethylenedioxy-desoxynormorphine. Thus syrupy intermediate was then subjected to ketal cleavage with 2N hydrochloric acid in a manner analogous to that described in Example 22, and the cleavage product, N-(3'-furylmethyl)-14-hydroxy-7,8-dihydronormorphinone, was converted into its hydrochloride, isolated and crystallized. 2.2 gm (54.5 percent of theory) of the hydrochloride, m.p. 231°C, were obtained. The melting point reamined unchanged after recrystallization from ethanol/ether.

EXAMPLE 24

N-(2'-Methyl-3'-furylmethyl)-14-hydroxy-7,8-dihydronormorphinone by method D a. N-(2'-methyl-3'-furylmethyl)-14-hydroxy-7,8-dihydro-6,6-ethylenedioxy-desoxynormorphine Using a three-step procedure analogous to that described in Example 20, 3.3 gm (0.01 mol) of 14-hydroxy-7,8-dihydro-6,6-ethylenedioxy-normorphinone hydrochloride were reacted with 1.6 gm of 2-methyl-furan-3-carboxylic acid chloride, the reaction product was ketalized with ethyleneoxide, and the ketalization product was reduced with lithium aluminum hydride, yielding N-(2'-methyl-3'-furylmethyl)-14-hydroxy-7,8-dihydro-6,6-ethylenedioxy-desoxynormorphine as a syrupy residue.

b. The syrupy product obtained under (a) was subjected to ketal cleavage with 2 N hydrochloric acid in analogy to Example 22. The cleavage product, isolated by chloroform extraction, was crystallized from 250 ml of methanol and 100 ml of water, yielding 2.7 gm (71 percent of theory, based on steps a and b) of N-(2'-methyl-3'-furylmethyl)-14-hydroxy-7,8-dihydro-normorphinone having a melting point of 229°C; after recrystallization from 150 ml of methanol and 10 ml of water it had a melting point of 230°C.

EXAMPLE 25

Using a procedure analogous to that described in Example 24, 2.5 gm (65.5 percent of theory) of N-(3'-methyl-furfuryl)-14-hydroxy-7,8-dihydro-normorphinone, m.p. 263°C (crystallized from toluene), were obtained from 3.3 gm (0.01 mol) of 14-hydroxy-7,8-dihydro-6,6-ethylenedioxy-desoxynormorphine. Recrystallization of the product from toluene did not change the melting point.

EXAMPLE 26

N-Thenyl-14-hydroxy-7,8-dihydro-6,6-ethylenedioxydesoxynormorphine by method E

A mixture consisting of 8.4 gm (0.02 mol) of N-thenyl-14-hydroxy-7,8-dihydro-normorphinone hydrochloride (see Example 2), 30 ml of ethyleneglycol and 2.0 gm of p-toluenesulfonic acid was heated for two hours at 80°C in a vacuum of 0.01 mm Hg. Thereafter, the reaction mixture was cooled and was then stirred into 40 ml of 2 N ammonia. The crystalline substance which separated out was collected by vacuum filtration, washed with water, and dried first in the air and finally at 80°C, yielding 6.6 gm (77 percent of theory) of N-thenyl-14-hydroxy-7,8-dihydro-6,6-ethylendioxy-desoxynormorphine with a melting point of 191°C which remained unchanged after recrystallization from methanol/water.

EXAMPLE 27

N-(3'-Furylmethyl)-14-acetoxy-7,8-dihydro-norcodeinone and its hydrochloride by method F 2.7 gm (0.0645 mol) of N-(3'-furylmethyl)-14-hydroxy-7,8-dihydro-norcodeinone hydrochloride were shaken with a mixture consisting of 100 ml of chloroform and 50 ml of 2 N ammonia, and the chloroform phase was separated, washed with water, dried with sodium sulfate and evaporated in vacuo. The residue, the free base N-(3'-furylmethyl)-14-hydroxy-7,8-dihydro-norcodeinone, was admixed with 9 ml of acetic acid anhydride, and the mixture was heated for 15 minutes on a boiling water bath and then evaporated in vacuo. The residue was shaken with 30 ml of chloroform and ice water while adding portions of ammonia thereto to restore the pH to 7; shaking and adding ammonia was continued until the pH remained at 7. The chloroform phase was now separated, washed with water, dried with sodium sulfate and evaporated in vacuo. The residue, the free base N-(3'-furylmethyl)-14-acetoxy-7,8-dihydro-norcodeinone, was dissolved in a little methanol by addition of ethanolic hydrochloric acid to pH 6, the solution was admixed with absolute ether until it just began to turn cloudy, and the mixture was allowed to stand overnight in a refrigerator. The crystalline substance which had separated out was collected by vacuum filtration and washed first with ethanol/ether and then only with ether, yielding 1.9 gm (61.5 percent of theory) of the hydrochloride of the formula

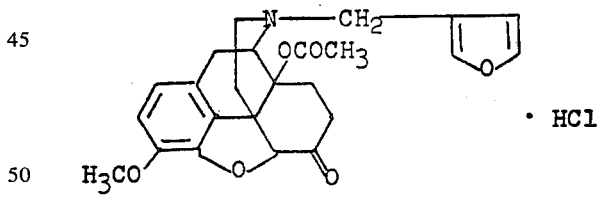

· HCl which had a melting point of 100°–103°C; it remained unchanged after recrystallization from methanol/ether.

EXAMPLE 28

Using a procedure analogous to that described in Example 27, 3.1 gm (73 percent of theory) of N-furfuryl-14-acetoxy-7,8-dihydro-norcodeinone, m.p. 202°'–203°C (203°C after recrystallization from ethanol), were obtained from 4.2 gm (0.01 mol) of N-furfuryl-14-hydroxy-7,8-dihydro-norcodeinone hydrochloride by crystallizing the evaporation residue of the chloroform extracts from ethanol.

EXAMPLE 29

Using a procedure analogous to that described in Example 27, 0.4 gm (71.5 percent of theory) of N-(3'- furylmethyl)-O³-acetyl-14-acetoxy-7,8-dihydro-normorphinone, m.p. 180°C, of the formula

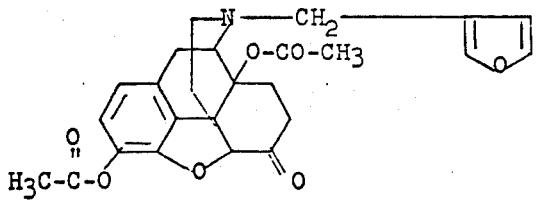

was obtained by converting 0.5 gm (0.00124 mol) of N-(3'-furylmethyl)-14-hydroxy-7,8-dihydro-normorphinone hydrochloride into the free base, acetylating the latter with 5 ml of acetic acid anhydride, working up the reaction mixture as described in Example 27, and crystallizing the reaction product from isopropanol.

EXAMPLE 30

N-(3'-Furylmethyl)-14-hydroxy-7,8-dihydro-6,6-propylenedioxy-desoxynormorphine by method E A mixture consisting of 1.85 gm (0.005 mol) of N-(3'-furylmethyl)-14-hydroxy-7,8-dihydro-normorphinone, 20 ml of absolute benzene, 1.0 gm of 1,3-propyleneglycol and 1.72 gm of p-toluenesulfonic acid was refluxed for four hours while continuously removing the water released by the reaction by azeotropic distillation. Thereafter, the reaction solution was evaporated in vacuo, and the residue was purified by column chromatography on 200 gm of silicagel in a manner analogous to that described in Example 1 and crystallized from aqueous methanol. 1.2 gm (55 percent of theory) of the compound named in the heading were obtained; it had a melting point of 223°C.

EXAMPLE 31

N-Thenyl-14-hydroxy-7,8-dihydro-6,6-dimethoxy-desoxynorcodeine by method E 1.7 gm (0.0033 mol) of N-thenyl-14-hydroxy-7,8-dihydro-norcodeinone hydrochloride were dissolved in 16 ml of absolute methanol, and the resulting solution was admixed with 0.8 ml of 72 percent perchloric acid and 8.0 ml of trimethyl orthoformate. The mixture was allowed to stand at room temperature and under exclusion of moisture overnight, and was then poured into 50 ml of an aqueous saturated sodium bicarbonate solution. The resulting mixture was extracted three times with 25 ml of chloroform each, the combined extracts were washed with water, dried with sodium sulfate and evaporated in vacuo, and the residue was crystallized from a mixture of 20 ml of methanol and 5 ml of water. 1.1 gm (73.5 percent of theory) of the compound named in the heading were obtained; it had a melting point of 128°C, which was unchanged after recrystallization from aqueous methanol.

EXAMPLE 32

N-(3'-Furylmethyl)-14-hydroxy-7,8-dihydro-normorphinone hydrochloride by method C a. 14-Hydroxy-7,8-dihydro-6,6-ethylenedioxy-desoxynormorphine A mixture consisting of 6.48 gm (0.02 mol) of 14-hydroxy-7,8-dihydro-normorphinone hydrochloride, 40 ml of ethyleneglycol, 0.5 gm of p-toluenesulfonic acid and 50 ml of absolute benzene was refluxed for 2 hours while continuously removing the water released by the reaction. Thereafter, the benzene was removed by evaporation in vacuo at about 50°C, leaving a syrup which consisted of a solution of 14-hydroxy-7,8-dihydro-6,6-ethylenedioxy-desoxynormorphine in ethyleneglycol.

b. O³, N-Di-(3'-furoyl)-14-hydroxy-7,8-dihydro-6,6-ethylenedioxy-desoxynormorphine The syrupy end product of step (a) was dissolved in 43 ml of absolute methylene chloride by addition of 1.62 ml of triethylamine, and the resulting solution was gradually admixed over a period of 15 minutes with a solution of 5.75 gm (0.044 mol) of furan-3-carboxylic acid chloride in 25 ml of absolute methylene chloride, accompanied by stirring. The resulting mixture was refluxed for four hours, then cooled and subsequently, in the presence of ice, washed first twice with 20 ml of 2 N hydrochloric acid each and then three times with 20 ml of water each. The organic phase was dried with sodium sulfate and evaporated in vacuo in a rotary evaporator, leaving 10.4 gm of a yellow oil.

c. O³-(3'-Furoyl)-N-(3''-thiofuroyl)-14-hydroxy-7,8-dihydro-6,6-ethylenedioxy-desoxynormorphine The oily end product of step (b) was dissolved in 100 ml of absolute pyridine, the solution was admixed with 2.56 gm of phosphorus pentasulfide, and the mixture was refluxed for 3 hours. Thereafter, the pyridine was removed in vacuo in a rotary evaporator, and the residue was shaken with a mixture of 100 ml of methylene chloride and 100 ml of water. The aqueous phase was separated and extracted with 50 ml of methylene chloride, the organic extract was combined with the methylene chloride phase, and the combined solution was washed, in the presence of ice, first with 50 ml of 2 N hydrochloric acid and then three times with 30 ml of water each, subsequently dried with sodium sulfate and evaporated in vacuo in a rotary evaporator, leaving 10 gm of a yellow oil.

d. N-(3'-Furylmethyl)-14-hydroxy-7,8-dihydro-6,6-ethylenedioxy-desoxynormorphine 5.0 gm of the oily end product of step (c) were dissolved in 60 ml of absolute tetrahydrofuran, and the solution was added dropwise to an ice-cooled suspension of 0.76 gm of lithium aluminum hydride in 20 ml of absolute tetrahydrofuran, accompanied by stirring. The ice bath was then removed, and the reaction mixture was stirred at room temperature for 30 minutes and subsequently refluxed for 2 hours. Thereafter, the reaction solution was worked up as described in Example 12(c); the evaporation residue of the chloroform extracts was the desired product.

(e) The end product of step (d) was refluxed for 2 hours with 50 ml of 2 N hydrochloric acid, the reaction mixture was allowed to cool and was then made alkaline with ammonia and extracted three times with 50 ml of chloroform each. The combined organic extracts were washed with water, dried with sodium sulfate and evaporated in vacuo. The residue was purified by chromatography on silicagel, as described in Example 1, and the purified base was converted into its hydrochloride and crystallized. 1.1 gm of N-(3'-furylmethyl)-14-hydroxy-7,8-dihydro-normorphinone hydrochloride, m.p. 229°–230°C, were obtained; after recrystallization from a mixture of 25 ml of ethanol, 1 ml of water and 25 ml of ether the product had a melting point of 230°–231°C.

The compounds embraced by formula I above and their non-toxic, pharmacologically acceptable acid addition salts, have useful pharmacodynamic properties. More particularly, they exhibit opiate antagonistic activities in warm-blooded animals, such as mice and rats.

For pharmaceutical purposes the compounds of the formula I or the non-toxic acid addition salts are administered to warm-blooded animals perorally, enterally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective analgesic and antitussive dosage unit of the compounds of the formula I and their non-toxic acid addition salts is from 0.166 to 5.0 mgm/kg body weight, preferably 0.83 to 2.5 mgm/kg body weight.

The following examples illustrate a few pharmaceutical dosage unit compositions comprising a compound of the formula I or a non-toxic acid addition salt thereof as an active ingredient and represent the best modes contemplated of putting the invention into practical use. The parts are parts by weight unless otherwise specified.

EXAMPLE 33

Tablets

The tablet composition is compounded from the following ingredients:

| | |
|---|---|
| N-Furfuryl-14-hydroxy-7,8-dihydro-normorphinone hydrochloride | 50.0 parts |
| Lactose | 95.0 parts |
| Corn starch | 45.0 parts |
| Colloidal silicic acid | 2.0 parts |
| Soluble starch | 5.0 parts |
| Magnesium stearate | 3.0 parts |
| Total | 200.0 parts |

Preparation:

The normorphinone compound is intimately admixed with the lactose and the corn starch, the mixture is moistened with an aqueous 10 percent solution of the soluble starch, the moist mass is forced through a 1 mm-mesh screen, the resulting granulate is dried at 40°C, the dry granulate is admixed with the colloidal silicic acid, and the composition is compressed into 200 mgm-tablets in a conventional tablet making machine. Each tablet contains 50 mgm of the normorphinone compound and is an oral dosage unit composition with effective opiate-antagonistic action.

EXAMPLE 34

Coated pills

The pill core composition is compounded from the following ingredients:

| | |
|---|---|
| N-Thenyl-14-hydroxy-7,8-dihydro-normorphinone hydrochloride | 75.0 parts |
| Lactose | 100.0 parts |
| Corn starch | 65.0 parts |
| Colloidal silicic acid | 2.0 parts |
| Soluble starch | 5.0 parts |
| Magnesium stearate | 3.0 parts |
| Total | 250.0 parts |

Preparation:

The ingredients are compounded in the same manner as in Example 33, and the composition is compressed into 250 mgm-pill cores which are subsequently coated with a thin shell consisting essentially of a mixture of sugar, talcum and gum arabic and finally polished with beeswax. Each coated pill contains 75 mgm of the normorphinone compound and is an oral dosage unit composition with effective opiate-antagonistic activity.

EXAMPLE 35

Suppositories

The suppository composition is compounded from the following ingredients:

| | |
|---|---|
| N-(3'-Thienylmethyl)-14-hydroxy-7,8-dihydro-normorphinone hydrochloride | 50.0 parts |
| Lactose | 250.0 parts |
| Suppository base (e.g. cocoa butter) | 1400.0 parts |
| Total | 1700.0 parts |

Preparation:

The normorphinone compound is intimately admixed with the lactose, and the mixture is blended with the aid of an immersion homogenizer into the suppository base which had previously been melted and cooled to about 40°C. 1700 mgm-portions of the composition are poured into cooled suppository molds and allowed to harden therein. Each suppository contains 50 mgm of the normorphinone compound and is a rectal dosage unit composition with effective opiate-antagonistic action.

EXAMPLE 36

Hypodermic solution

The solution is compounded from the following ingredients:

| | |
|---|---|
| N-Furfuryl-14-hydroxy-7,8-dihydro-norcodeinone methanesulfonate | 75.0 parts |
| Sodium chloride | 5.0 parts |
| Double-distilled water q.s.ad | 2000.0 parts by vol. |

Preparation:

The norcodeinone compound and the sodium chloride are dissolved in the double-distilled water, the solution is filtered until free from suspended particles, and the filtrate is filled under aseptic conditions into 2 cc-ampules which are subsequently sterilized and sealed. Each ampule contains 75 mgm of the norcodeinone compound, and its contents are an injectable dosage unit composition with effective opiate-antagonistic action.

EXAMPLE 37

Drop solution

The solution is compounded from the following ingredients:

| | |
|---|---|
| N-(3'-Furylmethyl)-14-hydroxy-7,8-dihydro-norcodeinone hydrochloride | 0.70 parts |
| Methyl p-hydroxy-benzoate | 0.07 parts |
| Propyl p-hydroxy-benzoate | 0.03 parts |
| Demineralized water q.s.ad | 100.0 parts by vol. |

Preparation:

The norcodeinone compound and the p-hydroxy-benzoates are dissolved in the demineralized water, the solution is filtered, and the filtrate is filled into 100 ml-bottles. 10 ml of the solution contain 70 mgm of the norcodeinone compound and are an oral dosage unit composition with effective opiate-antagonistic action.

Analogous results are obtained when any one of the other compounds embraced by formula I or a non-toxic acid addition salt thereof is substituted for the particular nomorphinone or norcodeinone in Examples 33 through 37. Likewise, the amount of active ingredient in these illustrative examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. An opiate antagonist composition in dosage unit form consisting essentially of an inert pharmaceutical carrier and an effective opiate-antagonistic amount of a compound of the formula

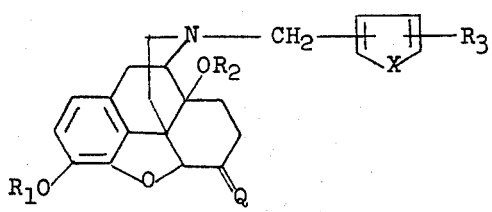

wherein
$R_1$ is hydrogen, methyl or acetyl,
$R_2$ is hydrogen or acetyl,
$R_3$ is hydrogen or methyl,
Q is oxygen, dimethoxy, diethoxy, ethylenedioxy or propylene(1,3)dioxy, and
X is oxygen or sulfur,
or a non-toxic, pharamacologically acceptable acid addition salt thereof.

2. A composition of claim 1, wherein said compound is of the formula

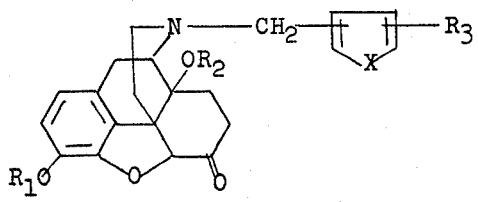

wherein
$R_1$ is hydrogen, methyl or acetyl,
$R_2$ is hydrogen or acetyl,
$R_3$ is hydrogen or methyl, and
X is oxygen or sulfur,
or a non-toxic, pharmacologically acceptable acid addition salt thereof.

3. A composition of claim 1, wherein said compound is of the formula

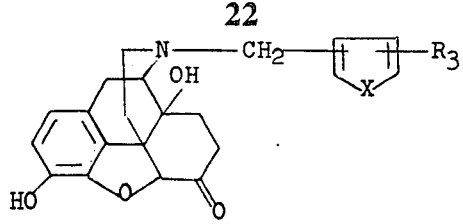

wherein
$R_3$ is hydrogen or methyl, and
X is oxygen or sulfur,
or a non-toxic, pharmacologically acceptable acid addition salt thereof.

4. A composition of claim 1, wherein said compound is of the formula

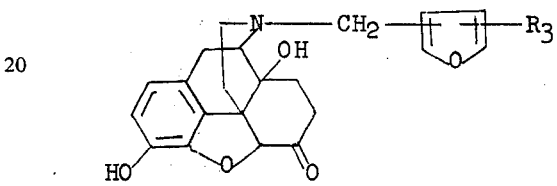

wherein $R_3$ is hydrogen or methyl, or a non-toxic, pharmacologically acceptable acid addition salt thereof.

5. A composition of claim 1, wherein said compound is N-furfuryl-14-hydroxy-7,8-dihydro-normorphinone or a non-toxic, pharmacologically acceptable acid addition salt thereof.

6. A composition of claim 1, wherein said compound is N-thenyl-14-hydroxy-7,8-dihydro-normorphinone or a nontoxic, pharmacologically acceptable acid addition salt thereof.

7. A composition of claim 1, wherein said compound is N-(3'-thienyl-methyl)-14-hydroxy-7,8-dihydro-normorphinone or a non-toxic, pharmacologically acceptable acid addition salt thereof.

8. A composition of claim 1, wherein said compound is N-furfuryl-14-hydroxy-7,8-dihydro-norcodeinone or a non-toxic, pharmacologically acceptable acid addition salt thereof.

9. A composition of claim 1, wherein said compound is N-(3'-furyl-methyl)-14-hydroxy-7,8-dihydro-norcodeinone or a non-toxic, pharmacologically acceptable acid addition salt thereof.

10. A composition of claim 1, wherein said compound is N-(2'-methyl-3'-furylmethyl)-14-hydroxy-7,8-dihydro-norcodeinone or a non-toxic, pharmacologically acceptable acid addition salt thereof.

11. The method of antagonizing the pharmacological effects of an opiate in a warm-blooded animal, which comprises administering to said animal an effective opiate-antagonistic amount of a compound of the formula

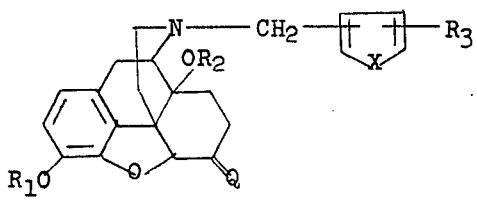

wherein

R₁ is hydrogen, methyl or acetyl,
R₂ is hydrogen or acetyl,
R₃ is hydrogen or methyl,
Q is oxygen, dimethoxy, diethoxy, ethylenedioxy or propylene(1,3)dioxy, and
X is oxygen or sulfur,
or non-toxic pharmacologically acceptable acid addition salt thereof.

12. The method of claim 11, wherein said compound is of the formula

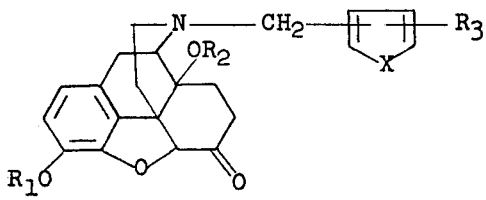

wherein
R₁ is hydrogen, methyl or acetyl,
R₂ is hydrogen or acetyl,
R₃ is hydrogen or methyl, and
X is oxygen or sulfur,
or a non-toxic, pharmacologically acceptable acid addition salt thereof.

13. The method of claim 11, wherein said compound is of the formula

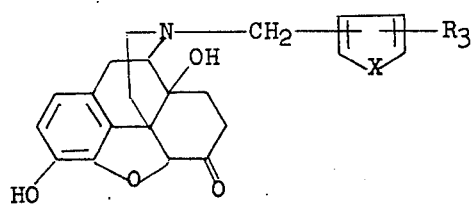

wherein
R₃ is hydrogen or methyl, and
X is oxygen or sulfur,
or a non-toxic, pharmacologically acceptable acid addition salt thereof.

14. The method of claim 11, wherein said compound is of the formula

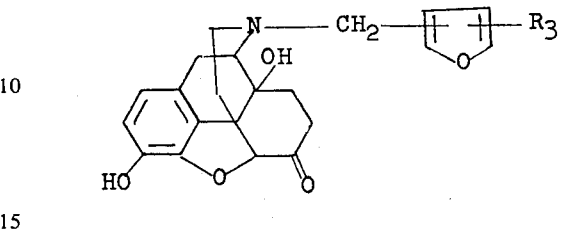

wherein R₃ is hydrogen or methyl, or a non-toxic, pharmacologically acceptable acid addition salt thereof.

15. The method of claim 11, wherein said compound is N-furfuryl-14-hydroxy-7,8-dihydro-normorphinone or a non-toxic, pharmacologically acceptable acid addition salt thereof.

16. The method of claim 11, wherein said compound is N-thenyl-14-hydroxy-7,8-dihydro-normorphinone or a non-toxic, pharmacologically acceptable acid addition salt thereof.

17. The method of claim 11, wherein said compound is N-(3'-thienyl-methyl)-14-hydroxy-7,8-dihydro-normorphinone or a non-toxic, pharmacologically acceptable acid addition salt thereof.

18. The method of claim 11, wherein said compound is N-furfuryl-14-hydroxy-7,8-dihydro-norcodeinone or a non-toxic, pharmacologically acceptable acid addition salt thereof.

19. The method of claim 11, wherein said compound is N-(3'-furylmethyl)-14-hydroxy-7,8-dihydro-norcodeinone or a non-toxic, pharmacologically acceptable acid addition salt thereof.

20. The method of claim 11, wherein said compound is N-(2'-methyl-3'-furylmethyl)-14-hydroxy-7,8-dihydro-norcodeinone or a non-toxic, pharmacologically acceptable acid addition salt thereof.

* * * * *